US005590922A

United States Patent [19]

Hucknall

[11] Patent Number: 5,590,922

[45] Date of Patent: Jan. 7, 1997

[54] SECURITY DEVICE

[76] Inventor: Richard Hucknall, 3 Fairview Ave., Great Neck, N.Y. 11023

[21] Appl. No.: 394,584

[22] Filed: Feb. 27, 1995

[51] Int. Cl.[6] .................................................. C05C 19/00

[52] U.S. Cl. .................................. 292/300; 292/DIG. 17; 292/202

[58] Field of Search .................................... 292/300, 303, 292/DIG. 17, 297, 290, 202

[56] References Cited

U.S. PATENT DOCUMENTS

| | | | |
|---|---|---|---|
| Re. 29,162 | 3/1977 | McLennan | 292/290 X |
| 148,919 | 3/1874 | Blackman . | |
| 278,862 | 6/1883 | Boucher | 292/DIG. 17 X |
| 420,290 | 1/1890 | Woodard . | |
| 538,078 | 4/1895 | Kerler . | |
| 2,799,888 | 7/1957 | White | 292/DIG. 17 X |
| 2,898,991 | 8/1959 | Kelly et al. | 292/300 |
| 3,811,150 | 5/1974 | Chalmers | 292/DIG. 17 X |
| 3,911,623 | 10/1975 | Prohaskn . | |
| 3,913,961 | 10/1975 | Dugan | 292/290 |
| 3,969,788 | 7/1976 | McCullough | 292/DIG. 17 X |
| 4,311,330 | 1/1982 | Lum | 292/210 |
| 5,407,240 | 4/1995 | Andre et al. | 292/67 |

*Primary Examiner*—Rodney M. Lindsey
*Assistant Examiner*—Monica E. Millner
*Attorney, Agent, or Firm*—Robert R. Strack

[57] ABSTRACT

A security device for locking adjacent members, comprising an apertured latch plate mounted on one member, and a locking device mounted on the other. The locking device is provided with a pivotally mounted element that is rotatable into locking engagement through the apertures of the latch plate. The actuating handle of the pivotally mounted element projects along a plane substantially parallel to the member on which it is mounted during engagement and at an outward angle therefrom during disengagement, detent means being provided to discretely establish these two conditions.

12 Claims, 2 Drawing Sheets

SECURITY DEVICE

BACKGROUND OF THE INVENTION

1. Field of the Invention

The present invention relates to security devices; and more particularly to latches for securing the edges of pivotally mounted doors, gates, and similar closure units.

The rising crime rate and the increased perception of insecurity, even within one's own home, has given impetus to the use of "extra protection" security devices. Unlike conventional locks, these devices are enabled or activated when the occupant is within their dwelling. They are controlled from the inside and do not require keys.

The principle characteristic of such devices is their effectiveness. Generally these devices should not be accessible to anyone except from within the premises. They should be at least as strong as the door and frame structures to which they are attached. They must not be subject to dislodgement during attempts to breach the security of the premises.

Optimally, these devices are manually operable, easy to understand without instructions, permanently affixed to the structures being protected, conspicuous—yet not obtrusive. Aged and handicapped people, and the strictures of the current Americans with Disabilities Act, require recognition that there may be limited visual acuity and dexterity available. Blind people and those without the availability of digital dexterity should be able to use these security devices 2. Description of the Prior Art Locks and latches are among the most ancient interests of property owners and they have long stimulated the minds and creativity of inventors and security specialists. Where two juxtaposed objects are to be fastened, it is conventional to mount a stationary apertured plate on one member and a movable element on the other member for selective interlocking engagement. In lieu of better devices, slide-bolts, braces, and bars are frequently used.

The 1874 Patent to Blackman, U.S. Pat. No. 148,919, illustrates a latch for mounting on the adjacent edges of double hung sash, including a lever on one sash having locking arms adapted to engage a keeper on the other. The 1890 Patent to Woodard, U.S. Pat. No. 420,290, reveals an adaptation of this basic principle to coffin fasteners. Conventional slide bolts with a translatable bolt on the door, adapted to engage a fixed plate on the adjacent door jamb, need no illustration to elicit recognition and understanding.

The Kerler latch in U.S. Pat. No. 538,078, is not designed for security, but illustrates the pivotal mounting of a movable latch member to effect engagement and disengagement to a fixed plate as a door is closed and opened. Unlike the preferred characteristics of the present invention, to accommodate the keeper, this device requires undesirable cut-outs in the door and frame.

SUMMARY OF THE INVENTION

When designing a security device to impede forced entry, the integrity and effectiveness of the device can be improved by proper selection of size and shapes to direct the anticipated force of an undesired entry, into directions that use the structure of the device and building synergistically to improve the holding power of the integrated system.

It is an object the present invention to provide an improved security system.

It is another object of the present invention to provide an improved security device that is suitable for mounting on adjacent surfaces to prevent relative movement thereof.

It is another object of the present invention to provide an improved security device that is operative with minimum manual dexterity.

It is another object of the present invention to provide an improved security device whose operative/inoperative condition is visually apparent from a distance.

The invention features separate elements adapted for mounting on adjacent portions of two relatively movable members. In particular instances, these members may be a pivotally mounted door and the adjacent door frame, adjacent window sash, or various cabinet structures. When used for securing a door, the elements of the invention are anchored to the door and door frame in such a manner that they enhance the holding power of the security system. They are fastened into the frame and door over extended areas and in directions to prevent dislodgement under the pressures of forced entry.

The invention features elements designed to interlock at an angle relative to the normal opening direction of the door, such that forced entry applies pressure which increases the engagement of the elements, thereby effecting an increased deterrent to the opening of the door.

The invention further features the use of only slight movement to effect either locking engagement or opening, so that elderly and handicapped people may operate the unit effortlessly, without instruction, and without the possibility of erroneously thinking the unit is in a condition other than the one intended.

In an illustrative embodiment, the invention features a dual function spring that holds the unit disengaged when open, preventing accidental locking if the door is slammed shut; and which keeps the locking elements engaged when locked, as protection against the effects of shaking or pounding on the door or frame.

A particular feature of the invention is the ease with which the security device may be mounted on most existing structures, without need for deformation or damage to such structures.

Another feature of the invention is use of a pivoting locking handle that is manually actuable without digital dexterity to distinctly effect locked or unlocked conditions, recognizable by both touch and sight.

In some embodiments of the invention the locking elements are not accessible to breach from the outside of the secured area, assuring that they cannot be opened without authorization.

Yet, in other embodiments of the invention, means may be provided whereby the locking elements can be disengaged from outside of secured premises in emergency situations.

In accordance with a particular embodiment of the invention, there is provided a security device for latching adjacent members, comprising an apertured latch plate mounted on one member, and a locking unit mounted on the other. The locking unit is provided with a pivotally mounted element that is rotatable into locking engagement through the apertures of the latch plate. The actuating handle of the pivotally mounted element projects along a plane substantially parallel to the member on which it is mounted during engagement, and at an outward angle therefrom during disengagement, detent means being provided to discretely establish these two conditions. When engaged, pressure applied to open the members, will effect increased locking interaction of the engaged elements.

These and other objects and features of the invention will be more clearly understood and appreciated from the following description and claims taken in conjunction with the drawings.

DESCRIPTION OF THE PREFERRED EMBODIMENT

The following description of a preferred embodiment describes a number of structural features to illustrate the concepts and functioning of means by which the invention may be practiced. It is intended that the invention should be restricted only to the extent defined by the appended claims.

Figure 1:
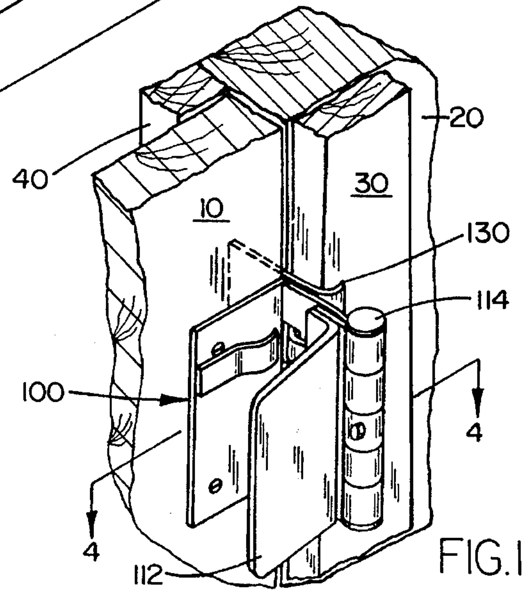
FIG. 1 shows a security device illustrating a preferred embodiment of the invention, mounted upon portions of a door and the adjacent frame.

FIG. 1 shows a security device, mounted to provide a security system for a door 10 which is mounted for pivotal movement within a door frame. The frame, within wall 20, includes face trim 30 and door stop 40. Hereinafter reference will be made to the door jamb. It should be understood that this contemplates conventional trim and subsurface structures of all types. A latch plate 130 is mounted to the door jamb in juxtaposition with the locking assembly 100, the latter being mounted upon door 10. As illustrated, the security device is in a closed, or engaged condition, the handle 112 thereof being substantially in a plane parallel to the plane of door 10. When the security device is in an opened, or unengaged condition, the handle 112 projects outwardly at an angle to the plane of door 10. This observable condition of the device, offers assurance to a sighted inhabitant of a secured area, even from a distance, that the security system is in a desired condition. The physical positioning of handle 112 also provides assurance to visually impaired inhabitants by simple tactile inspection.

Figure 2:
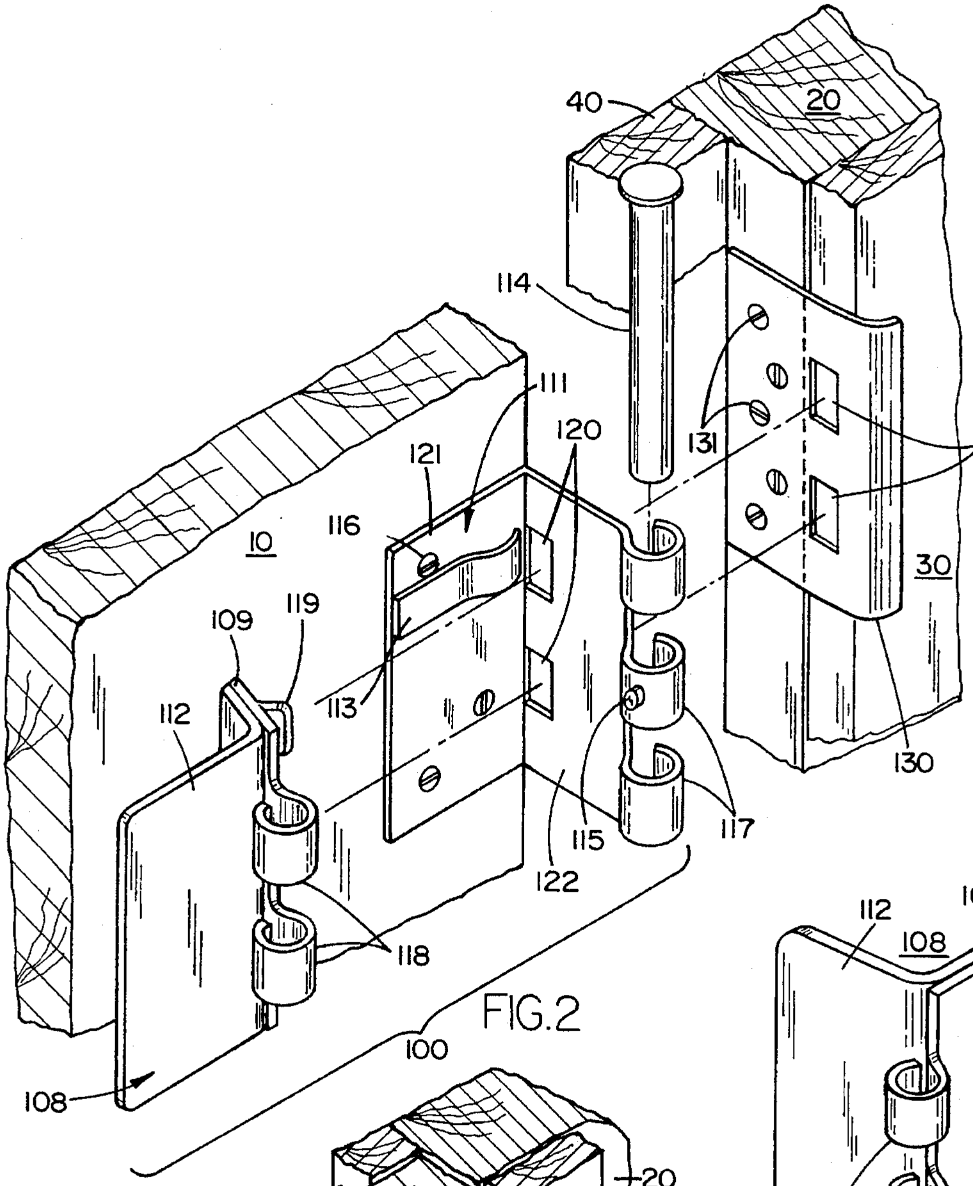
FIG. 2 is an exploded view of the elements of the preferred embodiment of the invention, illustrating principle components and their interrelationships.

The "exploded" presentation of FIG. 2, provides an understanding of the structure and cooperative relationship between the various elements of the device of the preferred embodiment.

The latch plate 130 is mounted at a convenient height on the door jamb in the door opening. The fasteners 131 may comprise suitable screws, projecting into the jamb and its substructure, in a plane parallel to wall 20 and the plane of the closed door 10.

The locking assembly is essentially a hinged structure comprising door plate 111 and locking element 108, pivotally assembled and secured by pin 114. When assembled, locking element 108 is discretely positioned in either an "open" or "locked" position by the interaction of detent spring 113 and the bight of locking lugs 119. This may best be seen in FIGS. 4 and 5. The rotational movement of locking element 108 is restricted by stop pin 115, which is preferably threaded into one of the cylindrical hinge loops 117 on door plate 111.

Door plate 111 includes mounting portion 121 and orthogonally projecting portion 122 which terminates in the hinge loops 117. Fasteners 116 mount portion 121 to door 10, and in the usual case may be screws of a type appropriate to the door composition. Apertures 120 pierce projecting portion 122, providing a path for locking lugs 119, through which they may pass to engage proximate apertures 132 in latch plate 130, when door 10 is closed.

Locking element 108 includes handle 112 and locking plate 109 either affixed or forming an integral part thereof. Locking plate 109 has two locking lugs 119 at the distal end and a pair of hinge loops 118 adjacent to handle 112. Hinge loops 118 and mating hinge loops 117 in door plate 111, are preferably wrapped or formed in opposing directions. The axis of the loops 117, 118 is displaced back from the edge of door 10 so that when the latch is engaged, the vector of the pressure moments when door 10 is forced, will be away from the door jamb.

Figure 3:
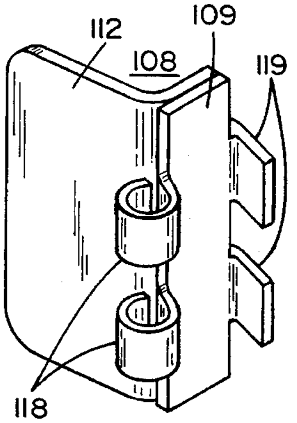
FIG. 3 is an illustration of the pivotally mounted locking element of the preferred embodiment, rotated 90 degrees clockwise from the position in FIG. 2.
Figure 4:
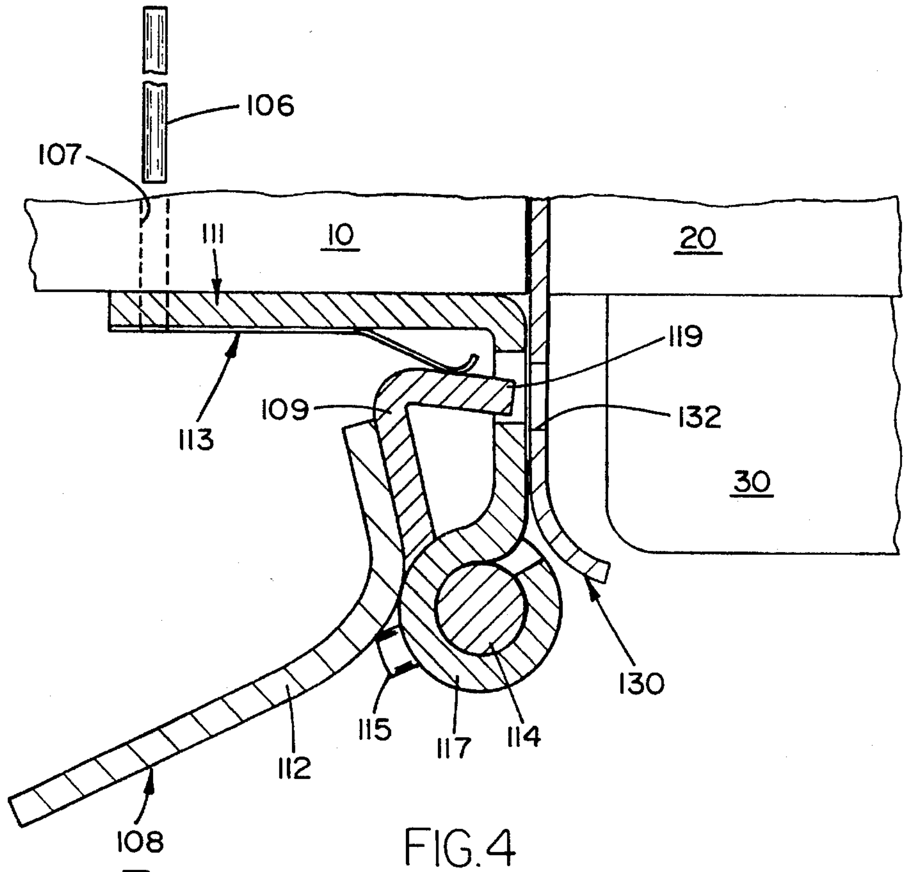
FIG. 4 is an enlarged sectional view taken along the line 4—4 in FIG. 1, showing an open security device in accordance with the preferred embodiment of the invention.
Figure 5:
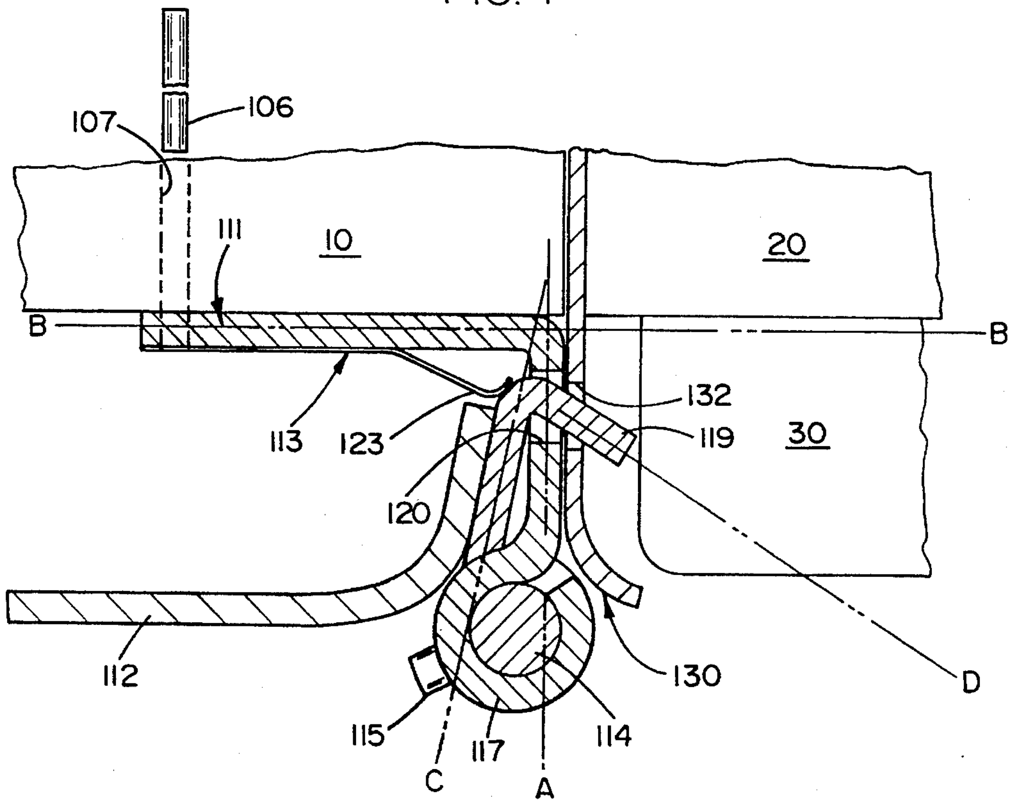
FIG. 5 is an enlarged sectional view taken along the line 4—4 in FIG. 1, showing a closed security device in accordance with the preferred embodiment of the invention.

Lugs 119 and loops 118 are configured, as seen in FIGS. 3, 4 and 5, to permit pivoting of locking element 108 about pin 114, to thrust lugs 119 through apertures 120, (and also through apertures 132 when the door 10 is closed and the apertures 120,132 are in alignment).

To operate the device of the invention, it is simply necessary to pull or push upon handle 112, effecting release or latching of the door, respectively.

Further consideration of FIGS. 4 and 5 will enhance the understanding of the invention and illuminate several important features. FIG. 4 shows the security device in an opened condition. FIG. 5 shows the security device in a closed condition.

When closed, locking lugs 119 project through both apertures 120 in door plate 111 and apertures 132 in latch plate 130. The apertures are dimensioned to permit unimpeded passage of lugs 119 when locking element 110 is rotated about pin 114 with door 10 in a closed position. Lugs 119 are shaped to provide an acute angle BD between axis B of door piece 121 and axis D of lugs 119, when the device is latched within latch plate 130. When in the quiescent condition of FIG. 5, with door 10 closed, there is preferably no contact between lugs 119 and the walls of apertures 120, 132. However, when pressure is applied to the outside of the door, the direction of the resulting force moment will tend to tightened the engagement of the elements and reinforce their locking action.

Attention is also directed to the angle AC between the axis A of the orthogonal projection 122 of door plate 111, and the axis C of locking plate 109. This angle is kept small to control the degree of movement required to lock and unlock the device. It assures that the pressure exerted to open a locked door will create a resultant moment that causes the door plate projection 122 to contract against the locking plate 109 and tighten the bight of lugs 119 within the apertures 120. 132.

FIGS. 4 and 5 also illustrate the functioning of detent 113, as a means for establishing the two discrete positions of locking element 108. In the open position of FIG. 4, the leading edge of detent spring 113 in conjunction with stop pin 115, holds locking element 108 with the lugs 119 withdrawn from the apertures 132. In the locked position of FIG. 5, the leading edge of detent spring 113 applies pressure to the back of the bight of locking lugs 119.

For purposes of illustration, the security system of the invention has been described in a preferred embodiment with the security device attached to a door. It has been supposed for development of this embodiment, that it the intent of the user that no one should be able to access the secured premises from the outside. The unique design of the security device of this invention lends itself to the inclusion of means whereby access from outside may be provided for emergency situations. The device might be used to secure the door of a toilet room or compartment and access may be required upon indication that the occupant is in distress and needs assistance. For such applications of the device, a single hole 107 may be provided, as shown in phantom outline in FIGS. 4 and 5, penetrating the door and mounting plate 111. This hole is positioned to permit entry of a shaft such as 106 through the door and into contact with the inside surface of latch handle 112. Pushing upon such a shaft, will easily effect rotation of handle 112 about hinge pin 114 and cause disengagement of the latch.

Having described particular embodiments of the invention, it will be appreciated that modifications will be apparent to those skilled in the art. For example, the unique features of the invention are suitable, and are contemplated, for latching other forms of relative moving members. It is intended to include all modifications which come within the scope of the following claims.

What is claimed is:

1. A security device for attachment upon adjacent members, wherein one member is stationary and the other member is mounted for translation past said one member, comprising latch means with apertures for attachment to one of said members, and a locking assembly for attachment to the other of said members in a position adjacent to said latch means; said locking assembly including a mounting plate to be fastened to said other member, having an orthogonally projecting portion along one edge thereof, the distal end of said projecting portion being formed to support a pin aligned along an axis parallel to said edge; a pivotally mounted element attached by said pin for rotation about said axis, into latching engagement through said apertures; said axis being displaced back from said edge of the mounting plate; said pivotally mounted element including a plurality of locking lugs, each juxtaposed with an aperture in said latch means; detent means on said locking assembly to discretely establish latching engagement and disengagement positions, and an actuating handle on said pivotally mounted element projecting along a plane substantially parallel to said mounting plate in said latching engagement position and at an outward angle therefrom in said disengagement position.

2. A security device for attachment upon adjacent members, wherein one member is stationary and the other member is mounted for translation past said one member, comprising latch means with apertures for attachment to one of said members, and a locking assembly for attachment to the other of said members in a position adjacent to said latch means; said locking assembly including a mounting plate with a planar portion to be fastened to said other member, and an orthogonally projecting portion along one edge thereof, the distal end of said projecting portion being formed to support a pin aligned along an axis parallel to said edge; a pivotally mounted element attached by said pin for rotation about said axis, into latching engagement through said apertures; means on said orthogonally projecting portion of said mounting plate to limit the rotation of said pivotally mounted element; said pivotally mounted element including a plurality of locking lugs, each juxtaposed with an aperture in said latch means; the axis of said locking lugs forming an acute angle with the plane of said mounting plate when said security device is engaged; detent means on said locking assembly to discretely establish latching engagement and disengagement positions; and an actuating handle on said pivotally mounted element projecting along a plane substantially parallel to said mounting plate in said latching engagement position and at an outward angle therefrom in said disengagement position.

3. A security device to be mounted upon adjacent members comprising latch means with at least one aperture for attachment to one of said members, and a locking assembly for attachment to the other of said members in a position adjacent to said latch means; said locking assembly having a base portion and a portion projecting therefrom, said projecting portion having at least one aperture therethrough, adapted to be positioned in juxtaposition with an aperture in said latch means, an element with a locking lug pivotally mounted on said projecting portion of said locking assembly to rotate whereby said lug penetrates said aperture therein, detent means on said locking assembly to discretely establish latching engagement and disengagement positions, and an actuating handle on said pivotally mounted element projecting along a plane substantially parallel to said base portion in said latching engagement position and at an outward angle therefrom in said disengagement position.

4. A security device as defined in claim 3, wherein said pivotally mounted element includes a plurality of locking lugs, each juxtaposed with an aperture in said latch means.

5. A security device as defined in claim 3, wherein said latch means is connected to said one member by fasteners inserted therein along axes substantially perpendicular to the direction of movement between said members.

6. A security device as defined in claim 3, wherein an aperture is provided through said other member in alignment with said pivotally mounted element, whereby means may be inserted therethrough to effect rotation of said pivotally mounted element.

7. A security device as defined in claim 3, wherein said detent means comprises biasing means coupled to said pivotally mounted element to establish a first position with said locking lugs extending through said apertures, and a second position with said locking lugs not extending through said apertures.

8. A security device as defined in claim 1, including a plurality of apertures in the orthogonally projecting portion of said mounting plate are disposed adjacent to those in said latch means when said members are in position to be latched, said apertures providing clearance for unimpeded passage of said locking lugs when so disposed.

9. A security device as defined in claim 8, including means to attach said latch means to said one member by fasteners inserted therein along axes substantially perpendicular to the direction of movement between said members.

10. A security device as defined in claim 9, wherein said detent means comprises biasing means on said mounting plate coupled to said pivotally mounted element to establish a first position with said locking lugs extending through said apertures, and a second position with said locking lugs not extending through said apertures.

11. A security device as defined in claim 10, wherein an aperture is provided through said other member in alignment with said pivotally mounted element, whereby means may be inserted therethrough to effect rotation of said pivotally mounted element.

12. A security device as defined in claim 3, wherein means are provided on said orthogonally projecting portion of said mounting plate to limit the rotation of said pivotally mounted element.

* * * * *